Feb. 20, 1934.   A. D. LEE   1,947,860
PROCESS FOR EXTRACTING METALS FROM ORES
Filed May 23, 1930   3 Sheets-Sheet 2
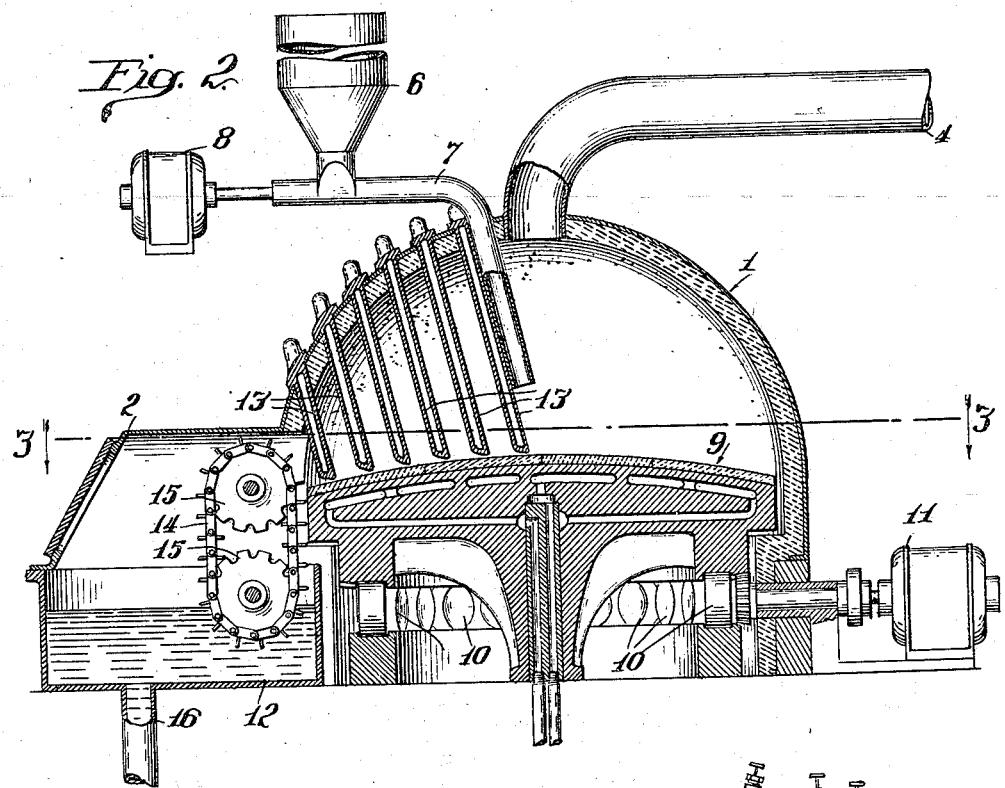
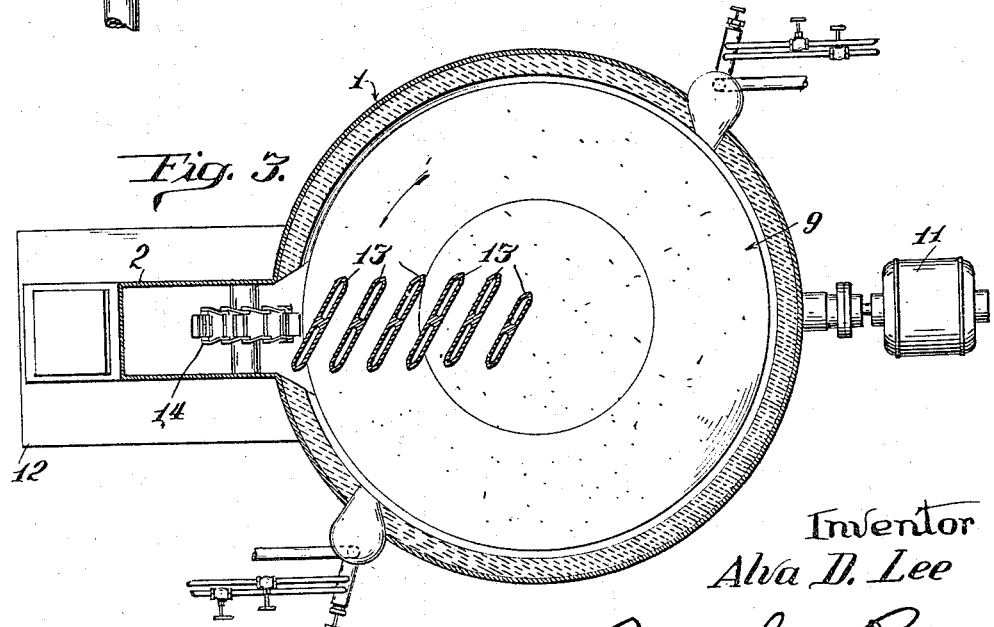
Inventor
Alva D. Lee
By Rudolph... 
Attorney.

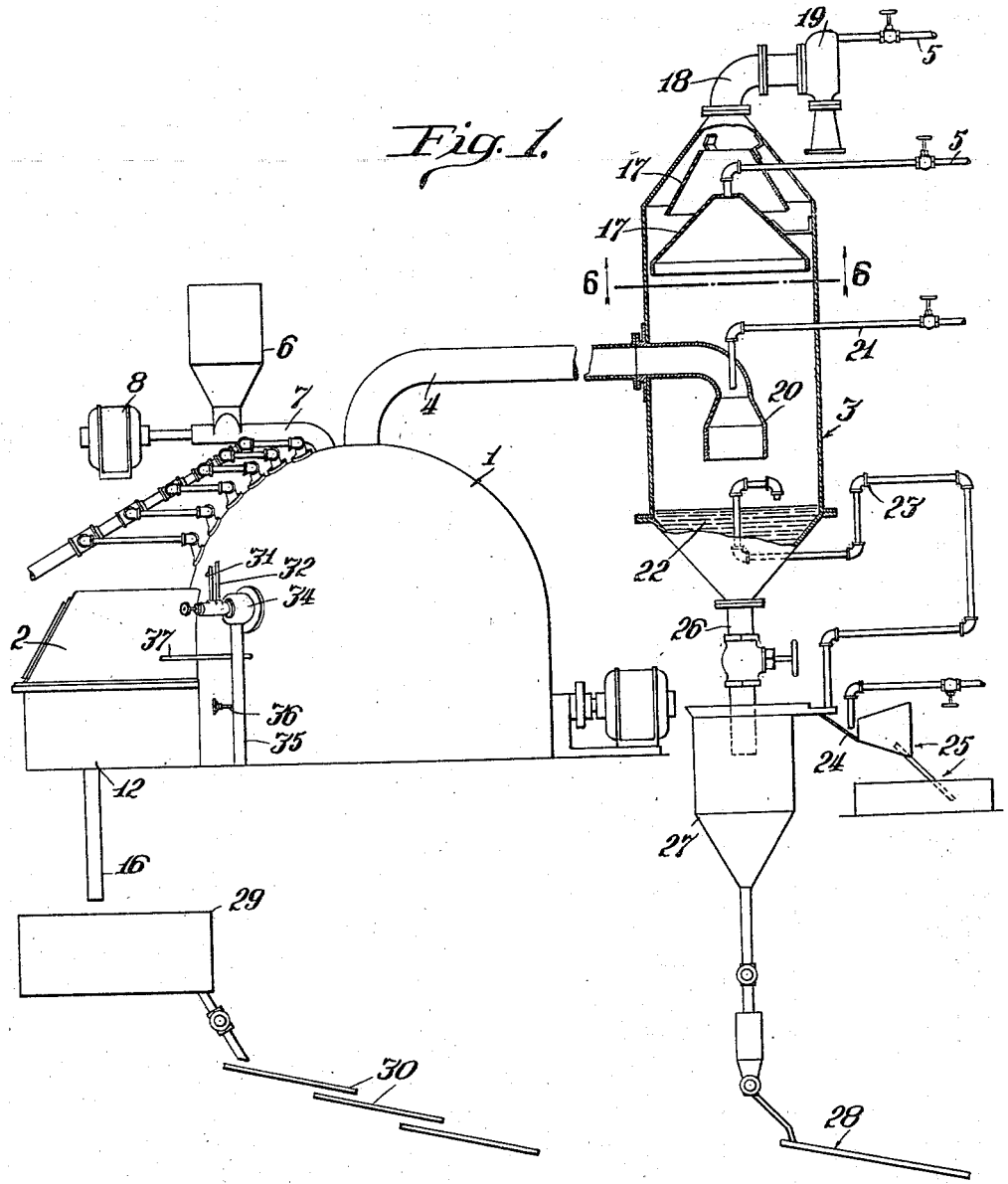

Feb. 20, 1934.  A. D. LEE  1,947,860
PROCESS FOR EXTRACTING METALS FROM ORES
Filed May 23, 1930  3 Sheets-Sheet 3
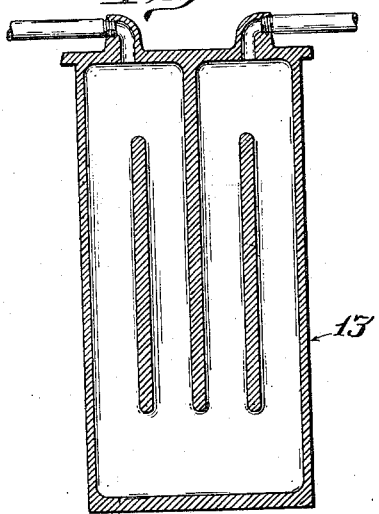
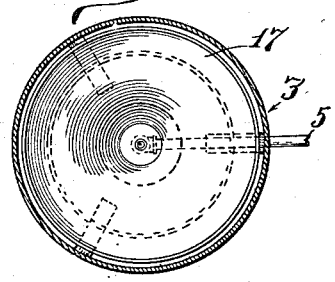
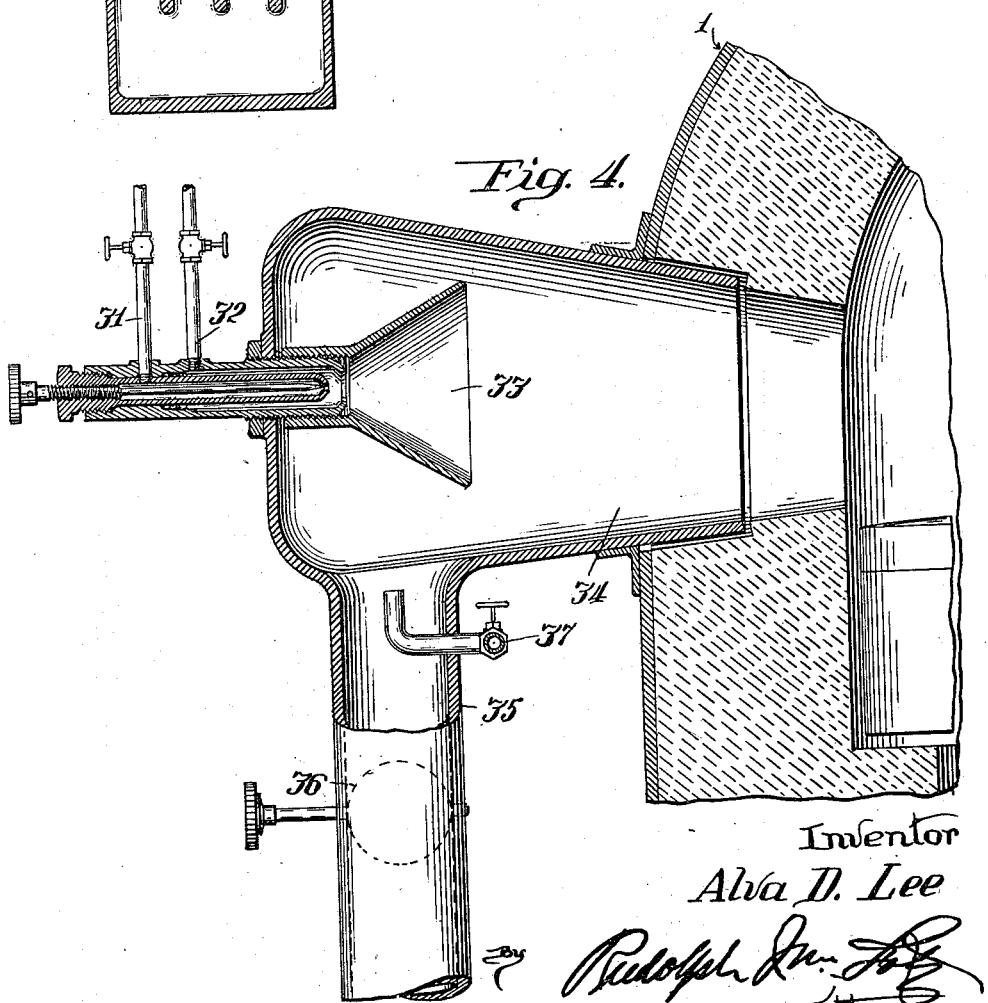
Inventor
Alva D. Lee
By Rudolph ...
Attorney Patented Feb. 20, 1934

1,947,860

UNITED STATES PATENT OFFICE 1,947,860

PROCESS FOR EXTRACTING METALS FROM ORES

Alva D. Lee, Requa, Calif.

Application May 23, 1930. Serial No. 454,960

8 Claims. (Cl. 75—17)

This invention relates to the art of extracting non-metallic minerals from ores so as to leave the metallic minerals free and ready for refining, and relates more particularly to the treatment of complex ores carrying rare metals of different melting points, different boiling points, and different chemical conditions in the form of salts of said metals.

The main object of the invention is to provide a method and apparatus for effecting concentration of the ores cheaply at temperatures sufficiently low and under conditions preventing oxidization or burning of the metals or the salts thereof.

The invention is particularly directed to the separation of non-metallics, lime and silica in particular, from such rare metals as platinum, palladium, iridium, osmium, uranium, beryllium, and other rare asociated metals. These rare metals are usually found associated with some of the common or baser metals, such as tin, lead, zinc, copper and iron, all having low oxidizing or boiling points.

Inasmuch as several of the rare metals are explosive at their boiling or oxidizing points, and have a much greater affinity for free oxygen, it is practically difficult to recover them at the customary smelting temperatures, and under the conditions pertaining to existing smelting methods, and as they produce a tremendous heat which throws the common or baser metals into a more rapid state of oxidation, the metals of the ore are thrown into a gaseous or vaporous oxide and prevents recovery of any appreciable part of the metals from the ore.

One of the main objects and essential features of the present invention is, therefore, to effect a heat treatment of complex ores in a reducing atmosphere, free from oxygen, said atmosphere carrying free carbon and hydrogen, thus avoiding any oxidation of any of the metals contained in the ore and furnishing a gas that will take care of any oxygen liberated from or contained in the ore or its constituents.

A further essential feature of the invention resides in effecting treatment of ores in an atmosphere of the character above indicated at a temperature approximating that ordinarily required for calcining ores, and inasmuch as several of the metals have low boiling points, and in a reducing atmosphere, go over as a metallic gas, as does quicksilver, to condense and throw them in the form of precipitates.

Since metallic gases are not stable and do not combine with other non-metallic gases at the temperature at which they go over, all metals going over at a calcining temperature are precipitated in metallic state.

A further essential feature of the invention resides in effecting complete dehydration of the lime and silica, expanding each so that when precipitated into cold water, the lime will be slaked and the silica fractured and broken up into fine particles thus leaving each separated from the metallic content of the ore, the latter being thus rendered easy of concentration.

A further essential feature of the invention resides in the driving off of certain non-metallic gases, leaving low melting point metals in the ore in metallic form, and those of high melting point in a reduced condition approximating their passing into a metallic state so that their specific gravity has been increased so that when the calcined ore is projected into cold water, the metallic content of the ore is chilled and shrunk to its greatest density, making concentration simple.

Thus, in carrying out the process of this invention, the ore to be treated is first reduced to one-half inch or less mesh.

This ore is then passed through a substantially hermetically sealed chamber suitably maintained substantially uniformly heated to a temperature ranging from 2,200° Fahr. to 2,600° Fahr., the ore being progressively passed through said chamber at a speed which depends upon the type of ore and the temperature at which it begins to become viscous. At that temperature the non-metallic elements have been thoroughly calcined. In many types of ore, the calcined ore need not be at a higher temperature than 1,400° Fahr. and the temperature of the ore fed from the chamber is not dependent upon the higher temperature of the chamber. The heat atmosphere of said chamber is maintained at a predetermined point, say, 2,250° Fahr. to 2,600° Fahr. with a reducing atmosphere free from oxygen, carrying an excess of carbon and hydrogen.

The lower the point of viscosity of an ore the less will be the time interval required to bring it to the temperature required, and the higher the point of viscosity, the longer will be the time interval required to bring it up to the required temperature.

As the granulated ore attains the said calcining temperature, it is projected directly from said chamber into cold water, thus to chill the same suddenly and effectively, to shock and shatter the silica and to slake the lime content.

During the said heating or calcining step above described, certain gases and low volatilizing point metals are liberated from the ore and pass into the higher temperature heating gases of the chamber, the oxygen theoretically combining with the carbon and sulphur and arsenic with the hydrogen.

The sudden chilling of the hot or semi-viscous ore by immersion in cold water effects the fracture of the silica and slakes the lime content of the ore, chills the metallic content, and, due to the great difference of coefficients of contraction, separates the non-metallic from the metallic content of the ore, which effectually liberates at least a very appreciable part of the metallic from the non-metallic content of the ore, it being practically impossible to ascertain what percentage of all the metallic content of the ore is liberated because, in the case of complex rare-metal ores, the total metallic content before treatment cannot be determined accurately.

For the purposes of economy and regularity of results, the above-described process is carried out as a continuous one by maintaining a constant feed of granulated ore into the heating chamber, as well as maintaining a continuous heat and regular feed of gases into said chamber as aforesaid, the ore progressing and being suitably shifted mechanically from its point of entry to its point of discharge from the said chamber or retort.

It will be understood and appreciated, of course, that the foregoing statements of chemical reactions and combinations occurring within the ore-treating chamber are largely, if not entirely, theoretical as no analyses of the non-metallic products of the treating chamber have been effected for the purpose of determining the same, the aim of the invention being directed particularly to the recovery of the more valuable metallic constituents of the ore in metallic form.

The process of this invention may be briefly defined as consisting of introducing crushed ore into a sealed chamber wherein the same is heated to a temperature ranging from a minimum of about 1,400° Fahr. to a maximum of about 2,600° Fahr. in the presence of gas or gases other than oxygen or from which free oxygen is, as far as possible, eliminated, and thereupon subjecting the hot ore and the gases of said chamber to sudden chilling for the purpose of precipitating the contained metals in metallic form.

The process may be further defined as including the method of introducing into and maintaining within the heating chamber an atmosphere substantially or entirely devoid of free oxygen which consists in projecting into said chamber a flame resulting from combustion other than perfect by limiting the oxygen content of the fuel to effect generation of carbon-dioxid and carbon-monoxid gases and, further, in generating or introducing into said chamber sufficient free hydrogen to promote the generation of hydrogenous compounds within the said chamber insofar as the theoretical assumption above expressed accords with fact. This theoretical assumption may also be regarded as extending to any free oxygen liberated from the ore under the influence of heat and the combination of said free oxygen with gases other than the metallic gases existing in said chamber.

The foregoing description of the process is based upon actual experimental experience in the treatment of complex ores which resulted in the recovery of many metals in metallic form as distinguished from salts of said metals, it being impossible to determine the percentage of the whole metallic contents of the ore thus recovered. The metallic precipitates recovered as aforesaid are necessarily commingled and are, to a certain extent, capable of being mechanically separated but in the main, are separable by chemical means only.

The process of the present invention is applicable to the treatment of a great variety of ores and is particularly useful in connection with very complex ores. As an example of an ore which has been treated, a coppergold ore from the Queen of Bronze mine of Takilma, Oregon, may be mentioned. This ore contains copper in the form of sulphide, carbonate and oxide, gold, and a quantity of white metals, the exact constitution of which has not been determined by analysis, but which probably include silver, platinum, palladium, iridium and possibly osmium, uranium, beryllium and aluminum.

A particular object of the invention is to provide a continuous process of treating ores in the manner above described and, to this end, I have illustrated in the accompanying drawings, a furnace structure adapted to the attainment of this object, said drawings being mainly diagrammatical.

In said drawings:

Fig. 1 is a diagrammatic side elevation, partly in section, of an ore treating apparatus constructed in accordance with the invention.

Fig. 2 is a vertical sectional view of the ore heating chamber of said apparatus.

Fig. 3 is a plan section on the line 3—3 of Fig. 2.

Fig. 4 is a detail vertical sectional view of the flame generating device or burner of the ore heating chamber.

Fig. 5 is a detail sectional view of a vane or rabble of the heating chamber.

Fig. 6 is a plan section on the line 6—6 of Fig. 1.

The said apparatus consists in the main of a furnace 1, a hot-ore receiver 2, and a gas-receiving and condensing member 3 which is connected with the furnace 1 by means of a pipe 4 and is also connected with a suitable source of supply 5 of cold water.

Above the furnace 1 there is provided a hopper 6 to receive granulated ore, said hopper being preferably provided with a suitable closure member and being connected by means of a pipe 7 with the furnace to deliver ore to substantially the center of the latter. This pipe 7 is suitably equipped with conveying means operated by the electric motor 8 or other suitable power.

Mounted for rotation on a vertical axis within the furnace 1 is an ore supporting turntable 9 suitably supported upon rollers 10 and actuated at desired speed by the electric motor 11 or other power. Said turntable 9 is preferably covered with firebrick or other heat-resistant material and may, if desired, be hollow to receive a circulating cooling fluid, such as water.

At one side of the furnace is a receptacle 12 for water which, with its closure hood, projects through an opening in the wall of said furnace, said receptacle being overhung at its inner end by the circumferential edge of the turntable 9.

Associated with the turntable 9 is a series of vanes or rabbles 13, the lower ends of which are positioned to practically contact with the surface of the latter, said vanes or rabbles being so disposed with reference to the direction of rotation of said turntable as to move the ore carried by the latter progressively toward the peripheral edge of said turntable, the outermost of said vanes being disposed to cause the ore to drop into the receptacle 12. The said receptacle is preferably equipped with power actuated distributing means such as a suitable conveyor chain 14 trained over suitable wheels or sprocket wheels 15 for scraping the ore or adhesive constituents thereof from the circumferential edge of said turntable and also to move the ore and constituents which enter the said receptacle toward the discharge pipe 16 of the latter or otherwise preventing said matter from accumulating at said inner end portion of said receptacle.

The vanes or rabbles 13 are hollow and are suitably connected with a source of supply of water and are constructed to effect proper distribution and circulation of water therethrough for maintaining said rabbles sufficiently cool to function.

The member 3 receives water at its upper end from the supply pipe 5 and is equipped internally with a series of hoods 17 which serve to distribute the flow of water and provide cold surfaces against which the gases delivered from the pipe 4 may impinge for condensation of such thereof as may be capable of condensation and precipitation as solids, the gases mentioned including vapors. The pipe 5 enters in such manner as to cause the water to be delivered into the gas exhaust pipe 18 which is connected with an exhaust fan or blower 19 which is intended and adapted to effect discharge of fixed gases from the receptacle 3.

The pipe 4 terminates in a discharge funnel 20 through the center of which a jet of water from the pipe 21 is continuously projected for the dual purpose of promoting discharge of said gases into the receptacle 3 and to cool and condense the less volatile constituents or unfixed gases. The solidified precipitates fall and are projected by the water into the bath 22 in the bottom of the latter wherein a substantially constant level is maintained by means of an overflow pipe 23 which discharges such overflow upon a separator plate or table 24 of suitable type and constituting a part of a concentrating apparatus 25. At intervals the tank or receptacle 3 is drained through pipe 26 into a tank 27 from which the water and contained precipitates are discharged upon the concentrating table or other device 28.

The water and contents of the receptacle 12 are received by the tank 29 and thence to a suitable concentrator 30.

The chamber of the furnace above the turntable 9 constitutes the ore-heating chamber which is preferably heated by projecting flame directly into the same substantially tangentially thereof from as many supply burners or the like as may be necessary and advisable. The fuel used is preferably crude oil atomized and projected by means of steam and air, the last-mentioned fluids being so proportioned to the oil as to be less than sufficient to effect perfect combustion or to admit free oxygen to said heating chamber. The flames from said burners are projected oppositely to the direction of travel of the turntable and are preferably caused to impinge directly upon the ore so as to heat the same as rapidly as possible. The said vanes will obviously act somewhat similar to plow-blades to cause a turnover of ore in passing and thus expose the entire ore body uniformly to the heat of said flames.

In the drawings, the burners diagrammatically illustrated comprise each an oil supply pipe 31 concentric with an air supply pipe 32 both discharging into a nozzle 33 disposed within a mixing chamber 34 having its discharge end projecting into a substantially tangential opening in the wall of the heating chamber. Supply pipe 35 for air equipped with a suitable valve 36 discharges into said mixing chamber, a steam supply nozzle 37 being disposed axially of said pipe 35.

The pipes 31 and 32 are suitably valve-controlled as is also the steam supply nozzle 37. The latter preferably supplies super-heated steam which, under the influence of the heat of the flame, will break up into its constituents, oxygen and hydrogen, to supply free hydrogen to said chamber.

It will be understood, of course, that the process may be carried out otherwise than by the apparatus illustrated and described and that the latter is theoretically adapted to the purpose and is merely examplary of a suitable apparatus for carrying out the aforesaid process. Furthermore, no attempt is herein made to illustrate accurately the details of construction.

I claim as my invention:

1. The process of extracting metal from ore which includes continuously introducing finely divided ore into an air-tight furnace, continuously feeding the same in a comparatively thin layer or stream, subjecting the layer of ore to the direct action of a highly reducing flame for a sufficient length of time to substantially reduce a part or all of the metallic elements, collecting and condensing the metallic vapors, gradually and continuously removing the hot residue and quenching the same without subjecting such residue, prior to quenching, to oxidizing conditions.

2. The process of extracting metal from ore which includes continuously introducing finely divided ore not previously heated into an air-tight furnace, feeding the ore in a comparatively thin layer or stream, and manipulating, stirring or agitating the same, subjecting the stirred layer of ore to the direct action of a highly reducing flame for a sufficient length of time to reduce the metallic elements thereof to a substantial extent, but not long enough to produce a molten mass, collecting and condensing the metallic vapors and progressively removing and quenching the residue without subjecting such residue prior to quenching to oxidizing conditions.

3. The process of extracting metal from ore which includes continuously introducing finely divided ore into an air-tight furnace, continuously feeding the ore in a comparatively thin layer or stream, subjecting the stream of ore to the direct action of a reducing flame, regulating the temperature of the ore by the rapidity of feed thereof to a temperature sufficient to produce reduction of the metallic constituents to a substantial extent, but not long enough to produce a molten mass, collecting and condensing the metallic vapors and progressively removing the hot residue and quenching the same without subjecting such residue to oxidizing conditions prior to quenching.

4. The process of extracting metal from ore which includes continuously introducing finely divided ore not previously heated into an airtight furnace, continuously feeding the same in a comparatively thin layer or stream, stirring the ore in the stream, subjecting the stream of ore to the direct action of a highly reducing flame from an oil burner for a sufficient length of time to heat the ore to a temperature at which the metallic constituents are reduced to a substantial extent, collecting and condensing the metallic vapors and quenching the residue without subjecting the same to oxidizing conditions prior to quenching.

5. The process of extracting metal from ore which includes continuously introducing finely divided ore not previously heated into an air-tight furnace, continuously feeding the same in a comparatively thin layer or stream, stirring the ore in the stream, subjecting the stream of ore to the direct action of a highly reducing flame from an oil burner, directed against the direction of travel of the ore, for a sufficient length of time to heat the ore to a temperature at which the metallic constituents are reduced to a substantial extent, collecting and condensing the metallic vapors and quenching the residue without subjecting the same to oxidizing conditions prior to quenching.

6. The process of extracting metal from ore which includes continuously introducing finely divided ore into an air-tight furnace, continuously feeding the ore in a compartively thin layer or stream while stirring the same, introducing fuel and air into a combustion chamber communicating with said furnace and completely consuming the oxygen in said air in said combustion chamber, subjecting the stream of ore to the direct action of the reducing flame issuing from said chamber for a sufficient length of time to reduce the metallic constituents of the ore to a substantial extent without producing a molten mass, collecting and condensing the metallic vapors, and quenching the residue of the ore without subjecting said residue to oxidizing conditions prior to quenching.

7. The process of extracting metal from ore which includes continuously introducing into an air-tight furnace finely divided ore not previously heated and not mixed with a flux, continuously feeding the ore in a comparatively thin layer or stream, while stirring the same, subjecting the layer or stream of ore to the direct action of a highly reducing flame for a sufficient length of time to reduce a substantial part of the metallic constituents of the ore, but not long enough to melt the ore to a completely molten mass, collecting and condensing the metallic vapors, and progressively removing the hot residue and quenching the same in water without subjecting such residue to oxidizing conditions.

8. The process of extracting metal from ore, which includes continuously feeding finely divided ore onto a rotary hearth in an air-tight furnace, causing the ore to be progresively fed across said hearth from near the center thereof towards the periphery as the hearth rotates, subjecting the ore, while it is being fed across said hearth, to the direct action of a highly reducing flame, collecting and condensing the metallic vapors given off from said ore and progressively discharging the hot residue of said ore from the periphery of said rotary hearth into a substantially airtight chamber containing water.

ALVA D. LEE.